(12) United States Patent
Gindele (10) Patent No.: US 6,907,144 B1
(45) Date of Patent: Jun. 14, 2005

(54) NOISE REDUCTION METHOD, APPARATUS, AND PROGRAM FOR DIGITAL IMAGE PROCESSING

(75) Inventor: Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/413,398

(22) Filed: Oct. 6, 1999

(51) Int. Cl.[7] .................................................. G06K 9/40
(52) U.S. Cl. ...................... 382/275; 382/262; 382/264
(58) Field of Search ................................ 382/260, 262, 382/264, 275

(56) References Cited

U.S. PATENT DOCUMENTS

| | | | |
|---|---|---|---|
| 4,446,484 A | | 5/1984 | Powell |
| 4,463,381 A | * | 7/1984 | Powell et al. ............... 348/625 |
| 4,731,865 A | | 3/1988 | Sievenpiper |
| 5,343,309 A | * | 8/1994 | Roetling .................... 358/3.07 |
| 5,568,558 A | * | 10/1996 | Ramm et al. ............. 381/94.4 |
| 5,671,264 A | | 9/1997 | Florent et al. |

FOREIGN PATENT DOCUMENTS

| | | | | |
|---|---|---|---|---|
| DE | 4329672 C1 | * | 12/1994 | ............ G06K/9/40 |
| EP | 0 893 783 A1 | | 1/1999 | |
| EP | 0 961 224 A1 | | 12/1999 | |

OTHER PUBLICATIONS

Normille. "Analysis and Application of Adaptive Noise Reduction Using Sparse Filters." 6th Multidimensional signal Processing Workshop, Sep. 1989, pp. 160–161.*

Inkinen et al. "Base Line Normalization of High Energy Physics Detector Signals Using Sparse Median operators." IEEE Winter Workshop on Nonlinear Digital Signal Processing, 1993, pp. 4.1–3.1 to 4.1–3.6.*

Akarun et al. "Adaptive Decimated Median Filters for Image Processing." ICASSP–93, IEEE Int. Conf. on Acoustics, Speech, and Signal Processing, Apr. 1993, vol. 5, pp. 69–72.*

Jong–Sen Lee, "Digital Image Smoothing and the Sigma Filter", *Computer Vision, Graphics, and Image Processing*, No. 24, 1983, pp. 255–269.

G. R. Arce & M. P. McLoughlin, "Theoretical Analysis of the Max/Median Filter", *IEEE Transactions on Acoustics, Speech, and Signal Processing*, vol. ASSP–35, No. 1, Jan. 1987, pp. 60–69.

* cited by examiner

*Primary Examiner*—Jon Chang
(74) *Attorney, Agent, or Firm*—Thomas H. Close (57) ABSTRACT

A method of processing a digital image channel to remove noise, includes the steps of: identifying a pixel of interest; calculating a noise reduced pixel value from a single weighted average of the pixels in a sparsely sampled local region including the pixel of interest; replacing the original value of the pixel of interest with the noise reduced pixel value; and repeating these operations for all of the pixels in the digital image channel.

4 Claims, 8 Drawing Sheets

NOISE REDUCTION METHOD, APPARATUS, AND PROGRAM FOR DIGITAL IMAGE PROCESSING

FIELD OF INVENTION

The present invention relates to a method, apparatus, and computer program for processing digital images to reduce noise.

BACKGROUND OF THE INVENTION

Many image processing noise reduction algorithms can be classified as non-linear spatial filters. Often these algorithms involve using the pixel values in a small local neighborhood surrounding the pixel of interest combined with some form of non-linear weighting and/or statistical conditions applied to the pixels in the neighborhood to derive a noise free estimate of the pixel of interest. The small local neighborhood is usually centered on the pixel of interest. For this class of noise reduction algorithms the filter size is fixed, meaning that all image pixels are processed with the same size local neighborhood. The most common shape to the local neighborhood is a rectangular region centered about the pixel of interest. Such a region can be characterized by a width and height. Usually the width and height dimensions are chosen to be symmetric.

An example of a fixed size rectangular region noise reduction algorithm is the Sigma Filter, described by Jong-Sen Lee in the journal article "Digital Image Smoothing and the Sigma Filter", *Computer Vision, Graphics, and Image Processing*, Vol. 24, 1983, pp. 255–269. This is a noise reduction filter that uses a non-linear pixel averaging technique sampled from a rectangular window about the center pixel. Pixels in the local neighborhood are either included or excluded from the numerical average on the basis of the difference between the pixel and the center pixel. Mathematically, the Sigma Filter can be represented as $$q_{mn} = \Sigma_{ij} a_{ij} p_{ij} / \Sigma_{ij} a_{ij}$$

and $$a_{ij} = 1 \text{ if } |p_{ij} - p_{mn}| >= \epsilon$$

$$a_{ij} = 0 \text{ if } |p_{ij} - p_{mn}| > \epsilon$$

where $p_{ij}$ represents the pixels in the local surround about the center pixel $p_{mn}$, $q_{mn}$ represents the noise cleaned pixel, and $\epsilon$ represents a numerical constant usually set to two times the expected noise standard deviation. The local pixels are sampled from a rectangular region centered about the pixel of interest.

The Sigma Filter was designed for image processing applications for which the dominant noise source is Gaussian additive noise. Signal dependent noise sources can easily be incorporated by making the e parameter a function of the signal strength. However, for both signal independent and signal dependent noise cases the expected noise standard deviation must be known to obtain optimal results. The Sigma Filter performs well on highly structured areas due to the fact that most of the image pixels in the local neighborhood are excluded from the averaging process. This leaves high signal strength regions nearly unaltered. The filter also works well in large uniform areas devoid of image signal structure due to the fact that most of the local pixels are included in the averaging process. For these regions, the Sigma Filter behaves as a low pass spatial filter with a rectangular shape. This low-pass spatial filter shape does not filter very low spatial frequency components of the noise. The resulting noise reduced images can have a blotchy or mottled appearance in otherwise large uniform areas.

Regions in images characterized by low amplitude signal modulation, or low signal strength, are not served well by the Sigma Filter. For these regions, most of the local pixel values are included in the averaging process thus resulting in a loss of signal modulation. Setting the threshold of the filter to a lower value does reduce the loss of signal, however, the noise is left mostly the same.

Another example of a fixed size non-linear noise filter was reported by Arce and McLoughlin in the journal article "Theoretical Analysis of the Max/Median Filter", *IEEE Transactions Acoustics, Speech and Signal Processing*, ASSP-35, No. 1, January 1987, pp. 60–69, they named the Max/Median Filter. This filter separated the local surround region into four overlapping regions horizontal, vertical, and two diagonal pixels with each region containing the center pixel. A pixel estimate was calculated for each region separately by applying and taking the statistical median pixel value sampled from the regions' pixel values. Of these four pixel estimates, the maximum valued estimate was chosen as the noise cleaned pixel. Mathematically the Max/Median Filter can be represented as $$q_{ij} = \text{maximum of } \{Z_1, Z_2, Z_3, Z_4\}$$

$Z_1$=median of $\{p_{i,j-w}, \ldots p_{ij}, \ldots, p_{ij+w}\}$
$Z_2$=median of $\{p_{i-w,j}, \ldots p_{i,j}, \ldots, p_{i+w,j}\}$
$Z_3$=median of $\{p_{i+w,j-w}, \ldots p_{i,j}, \ldots, p_{i-w,j+w}\}$
$Z_4$=median of $\{p_{i-w,j-w}, p_{i,j}, \ldots, p_{i+w,j+w}\}$ Where $q_{ij}$ represents the noise cleaned pixel, $Z_1$, $Z_2$, $Z_3$, and $Z_4$ represent the four pixel estimates, and $p_{ij}$ represents the local pixel values. The Max/Median Filter also reduces the noise present while preserving edges. For Gaussian additive noise, the statistical median value does not reduce the noise by as great a factor as numerical averaging. However, this filter does work well on non-Gaussian additive noise such as spurious noise.

Noise is most visible and objectionable in images containing areas with little signal structure, e.g. blue sky regions with little or no clouds. The Sigma filter can produce a blotchy, or mottled, effect when applied to image regions characterized by low signal content. This is largely due to the rectangular geometric sampling of local pixels strategy. The radial region sampling strategy employed by the Max/Median Filter produces noise reduced images with less objectionable artifacts in image regions characterized by low signal content. For images with high noise content, the artifacts produced by radial region sampling strategy have a structured appearance.

U.S. Pat. No. 5,671,264, issued Sep. 23, 1997 to Florent et al., entitled "Method for the Spatial Filtering of the Noise in a Digital Image, and Device for Carrying Out the Method", describes a variation of the Sigma Filter and Max/Median Filter. This algorithm borrows the technique of radial spatial sampling and multiple pixel estimates from the Max/Median Filter. However, the algorithm expands the number of radial line segment to include configurations with more than four segments. The algorithm uses combinations of Sigma and Median filters to form the individual region pixel estimates. These pixel estimates derived from the N regions are then combined by numerical averaging or taking the statistical median value to form the noise cleaned pixel value. A key component of this algorithm is the randomization of one of the three essential region parameters: length, orientation, and number of regions. The randomization of the filter parameters is performed on a pixel to pixel basis thus changing the inherent characteristics with pixel location. It is claimed that the randomization feature reduces the induced structured artifacts produced by the radial region geometry sampling method. The imaging application cited in U.S. Pat. No. 5,671,264 is medial x-ray imagery. This type of imagery is typically characterized by high noise content or a low signal-to-noise ratio. The structured artifacts introduced by the noise reduction algorithm are worse for low signal-to-noise ratio images.

Fixed rectangular local surround noise reduction can produce spatial artifacts. Algorithms employing small filter sizes take less computation time and preserve desirable low amplitude modulation signals but are also less affective at removing noise in unstructured regions. Algorithms employing large filter sizes take more computation time and are more effective at removing noise in unstructured regions but also destroy desirable low amplitude modulation signals and leave blotchy low spatial frequency noise artifacts. Radial region based noise reduction algorithms are effective at removing noise in unstructured regions but can produce unwanted structured patterns in the noise cleaned images. These unwanted spatial artifacts are highly dependent on the type of imagery processed, and in particular, on the signal-noise-ratio of the imagery. Varying the size, orientation, or number of radial regions randomly can reduce the objectionability of the unwanted structured patterns for low signal-to-noise ratio imagery but requires more computation time and complexity to switch filter patterns. What is needed is a noise reduction algorithm which uses a radial pattern of local pixels to reduce the structured artifacts without the computational complexity of randomly switching patterns.

SUMMARY OF THE INVENTION

It is an object of the present invention to provide a noise reduction method that uses a sparsely sampled local region of pixels, including the pixel of interest.

This object is achieved according to the present invention by providing a method of processing a digital image channel to remove noise, including the steps of: identifying a pixel of interest; calculating a noise reduced pixel value from a single weighted average of the pixels in a sparsely sampled local region including the pixel of interest; replacing the original value of the pixel of interest with the noise reduced pixel value; and repeating these operations for all of the pixels in the digital image channel.

The present invention overcomes the complexity limitation of multiple radially pattern algorithms by constructing a single sparsely sampled local region of pixels including the pixel of interest from the union of the pixels from multiple radial regions. Since the size and shape of the sparsely sampled local region of pixels is fixed, a minimum of computation time is involved to calculate the noise reduced pixel value. By excluding some pixels that would otherwise be included in a rectangular local region, the present invention overcomes the mottled artifacts produced by the Jong-Sen Lee's Sigma Filter.

It is another object of the present invention to construct the sparsely sampled local region of pixels with greater density of pixels near the pixel of interest. This arrangement of pixels leads to more effective noise removal since the pixels geometrically closer to the pixel of interest are more likely to have numerical values closer to the pixel of interest.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected form such systems, algorithms, components, and elements known n the art. Given the description as set forth in the following specification, all software implementation thereof is conventional and within the ordinary skill in such arts.

Still further, as used herein, the computer program may be stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well-known computer system, such as a personal computer.

A digital image is comprised of one or more digital image channels. Each digital image channel is comprised of a two-dimensional array of pixels. Each pixel value relates to the amount of light received by the imaging capture device corresponding to the geometrical domain of the pixel. For color imaging applications a digital image will typically consist of red, green, and blue digital image channels. Other configurations are also practices, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications. In fact, the present invention can be applied to any two dimensional array of noise corrupted data to obtain a noise cleaned output. Although the present invention describes a digital image channel as a two dimensional array of pixel values arranged by rows and columns, those skilled in the art will recognize that the present invention can be applied to mosaic (non rectilinear) arrays with equal effect. Those skilled in the art will also recognize that although the present invention describes replacing original pixel values with noise cleaned pixel values, it is also trivial to form a new digital image with the noise cleaned pixel values and retain the original pixel values in tact.

Figure 2:
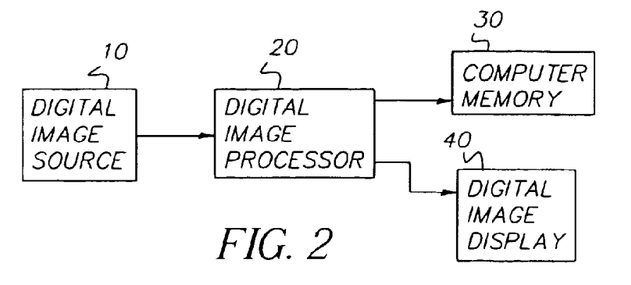
FIG. 2 represents a functional block diagram showing the component parts of an apparatus implementation of the present invention.

The present invention can be implemented in computer hardware. FIG. 2 shows a functional block diagram of the present invention implemented as a computer hardware apparatus. The digital image source 10 can be, but is not limited to, a photographic film scanner, a digital still frame camera, a motion film scanner, a digital motion imaging camera, or a web server computer. The digital image source 10 sends a digital image to the digital image processor 20 which produces a noise reduced digital image. The noise reduced digital image is sent to an output device such as, but not limited to, computer memory 30 or a digital image display 40. The digital image processor 20 can be implemented in computer hardware or computer software operating in a digital computer. A computer program product embodied in a computer program storage medium including computer code segments for implementing the present invention may also be provided. The method implementation of the present invention relates to the procedural steps embodied within the digital image processor 20.

Many different methods have been designed for the purpose of reducing the noise of digital images. The present invention can be categorized as a non-linear spatial filter noise reduction method. As such, the present invention relies on two main aspects which directly impact the image quality of results. A generalized non-linear spatial filter operation involves sampling the pixel values in a local neighborhood about a pixel of interest and applying mathematical logic to the local pixel values to calculate a processed pixel value. This procedure is repeated for some or all of the other pixels in the original digital image. A processed digital image is formed from the processed pixel values either by populating a new set of memory or by using the memory of the original digital image.

The term pixel of interest will refer to the pixel in the original digital image channel which is currently being processed. The numerical value of the pixel of interest will be referred to as the original pixel value. The values of local pixels sampled from a neighborhood about the pixel of interest are used to calculate the noise reduced pixel value. The geometric pattern of local pixels will be referred to as the sparsely sampled local region of pixels. The sum total of all mathematical logic processing applied to the values of pixels contained in the sparsely sampled local region will be referred to as the noise reduction logic. This processing of data through the application of the noise reduction logic results in a calculated numerical value which will be referred to as the noise reduced pixel value.

Figure 1:
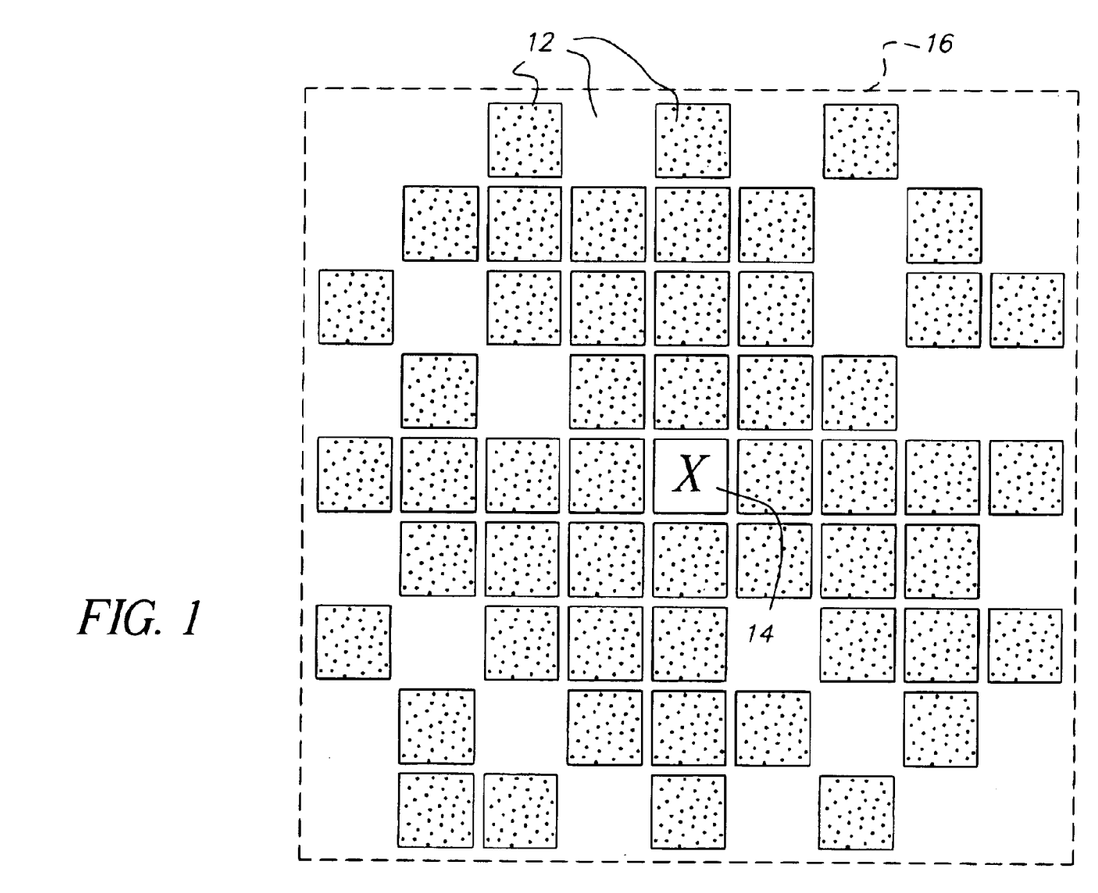
FIG. 1 is an example of a 9 by 9 pixel sparsely sampled local region of pixels used by the preferred embodiment of the present invention.

FIG. 1 is an illustration of a sparsely sampled local region of pixels 12. The pixels 12 contained in the sparsely sampled local region are indicated by black squares. The pixel 14 marked with an X is the pixel of interest which is also contained in the sparsely sampled local region 16.

Figure 3:
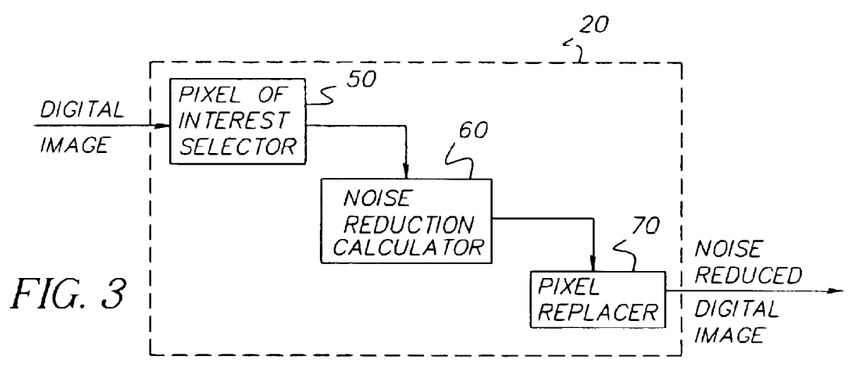
FIG. 3 represents a functional block diagram of a method and software implementation of the preferred embodiment of the present invention.

FIG. 3 shows a functional block diagram of the digital image processor 20 shown in FIG. 2. The pixel of interest selector 50 identifies the next pixel to be processed. If the entire digital image channel is to be processed, this operation involves retrieving the next sequential pixel. The noise reduction calculator 60 performs the operation of calculating the noise reduction pixel value corresponding to the pixel of interest. The pixel replacer 70 places the noise reduction pixel value at the location of the pixel of interest in either the newly populated memory or as a replacement value in the original digital image channel.

Figure 4:
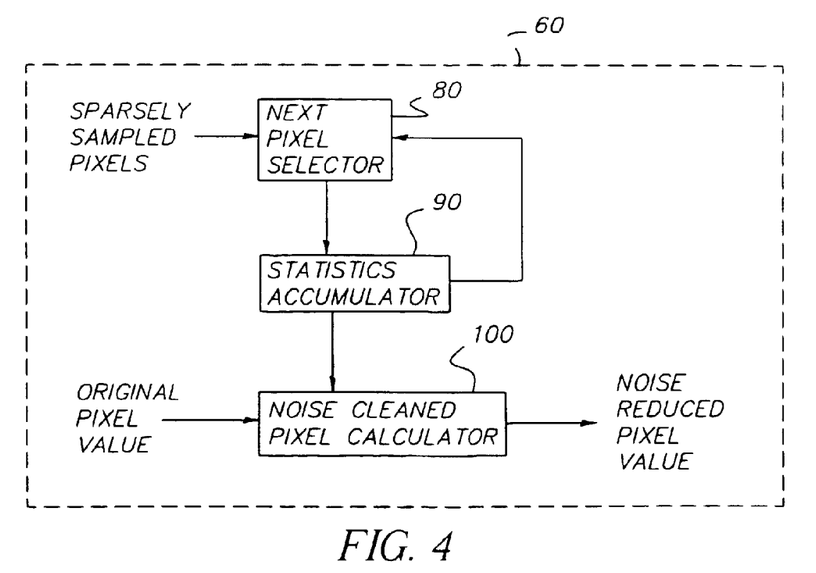
FIG. 4 represents a functional block diagram of the noise reduction calculator 60.

FIG. 4 illustrates a functional block diagram of the noise reduction calculated 60 which performs the noise reduction logic. The original pixel value is fed to the statistics accumulator 90. This value is stored for numerical comparisons. The next pixel selector 80 sequentially sends the values of the pixels contained in the sparsely sampled local region pixels, called the sampled pixel values, to the statistics accumulator 90. Mathematical logic is applied to the original pixel value and the sampled pixel values within the statistics accumulator 90. In the preferred embodiment of the present invention numerical comparisons between the original pixel value and the sampled pixel values are performed. The noise cleaned pixel calculator 100 uses the calculations made in the statistics accumulator 90 to calculate the noise reduced pixel value.

The preferred embodiment of the present invention uses the Sigma Filter, described by Jong-Sen Lee in his journal article, "Digital Image Smoothing and the Sigma Filter", as the noise reduction logic to calculate the noise reduced pixel value. The values of the pixels contained in the sparsely sampled local region are compared with the value of the pixel of interest. Each pixel in the sparsely sampled local region is given a weighting factor of one or zero based on the absolute difference between the value of the pixel of interest and the sampled pixel value. If the absolute value of the pixel value difference is less than or equal to a threshold $\epsilon$, the weighting factor is set to one; otherwise, the weighting factor is set to zero. The numerical constant $\epsilon$ is set to two times the expected noise standard deviation. Mathematically the expression for the calculation of the noise reduced pixel value is given as $$q_{mn} = \Sigma_k a_k p_k / \Sigma_k a_k$$

and $$a_k = 1 \text{ if } |p_k - p_{mn}| <= \epsilon$$

$$a_k = 0 \text{ if } |p_k - p^{mn}| > \epsilon$$

where $p_k$ represents the $k^{th}$ pixel contained in the sparsely sampled local region, $P_{mn}$ represents the value of the pixel of interest located at row m and column n, $a^k$ represents a weighting factor, and $q_{mn}$ represents the noise reduced pixel value. The summations of the weighted average of pixel values and of the weighting factors is performed in the statistics accumulator 50. The calculation of the noise reduced pixel value $q_{mn}$ as the division of the two sums is performed in noise reduction calculator 60. This process of calculating a weighting factor $a_k$ for each pixel in the sparsely sampled local region, calculating the summation of the weighting factor multiplied by the sampled pixel values, and dividing by the sum of the weighting factors is an example of a single weighted average. The result of this single weighted average is a weighted average value.

The preferred embodiment of the present invention uses a constant numerical value for $\epsilon$ to determine the noise reduced pixel value $q_{mn}$ for systems characterized by signal independent noise. According to an alternative embodiment, where the source of noise is signal dependent, i.e. depends on the value of the pixel of interest $p_{mn}$, the value of $\epsilon$ should track with $p_{mn}$, a pre-computed look-up-table of $\epsilon$ values corresponding to the signal dependence of the noise source is constructed. As each pixel of interest is processed, the value of $p_{mn}$ is used as an index into the look-up-table of $\epsilon$ values to set the current value of $\epsilon$, used to process the pixel of interest.

The preferred embodiment of the present invention uses a value of two times the expected noise source standard deviation for the value of $\epsilon$. However, it is noted that the relationship between the value of $\epsilon$ and the noise source standard deviation can be set differently depending on preference. Higher values of $\epsilon$ result in more noise reduction but more image content is also destroyed. Conversely, lower values of $\epsilon$ result in less loss of image content, but noisier images.

A further alternative embodiment of the present invention uses a median filter as the noise reduction logic to calculate the noise reduced pixel value. The process of sorting the sampled pixel values into ascending or descending order is performed in the statistics accumulator 90. The noise reduced pixel value is given by the statistical median of the sampled pixel values contained in the sparsely sampled local region. The operation of finding the median value of the sorted sampled pixel values is performed in the noise reduction calculator 60.

The principle difference between the preferred embodiment of the present invention and the Sigma Filter described by Jong-Sen Lee lies in the shape of the local region of pixels used to calculate the noise reduced pixel value. The Sigma Filter uses a rectangular region of local pixels centered about the pixel of interest. While this configuration is simple to code in computer logic, the rectangular sampling of pixels produces a blotchy or mottled appearance in the processed imagery. This is especially evident in structurally flat regions such as sky.

The present invention uses a method of sparsely sampling local pixels. In other words, some of the pixels in proximity to the pixel of interest are excluded from the calculation of the noise reduced pixel value based on their relative position to the pixel of interest. Thus a rectangular region of pixels would not be considered a sparsely sampled local region because no pixels within a bounding rectangle are excluded. The bounding rectangle for any region is defined as the smallest rectangle that includes all pixels contained in the region.

Figure 5:
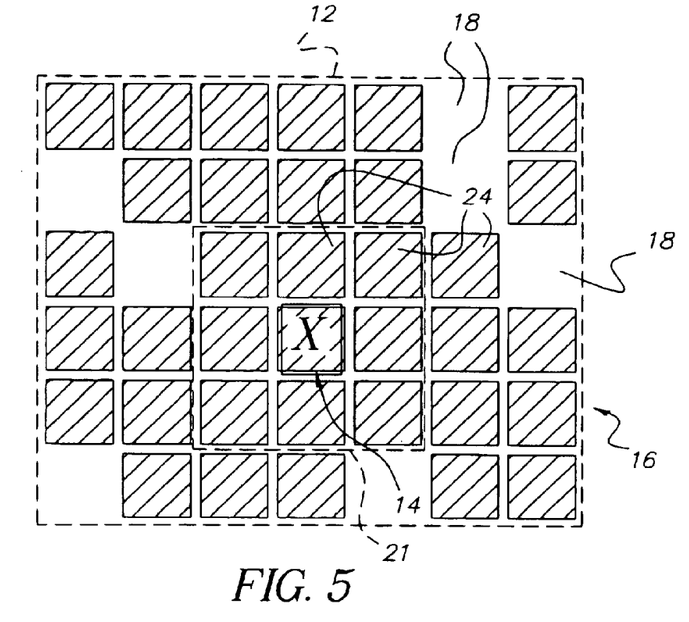
FIG. 5 shows an example of a sparsely sampled local region.

A sparsely sampled local region, in the context of the present invention, is defined as any local geometric pattern of pixels in the neighborhood defined by a bounding rectangle around the pixel of interest that has at least one excluded pixel from the pixels within the bounding rectangle. In the case where the pixels are not contiguous such as is found in the color pixels from an image sensor having a color filter array, the definition of sparsely sampled as used herein means that less than all of the available pixels of a particular color in the neighborhood of a pixel of interest of a particular color are employed in the sparse sample. FIG. 5 shows an example of a sparsely sampled local region 16 with pixel locations 18 within the bounding rectangle defining the region 16 that are excluded from the sparsely sampled region. The pixel of interest 14, marked with an X, is included in the sparsely sampled local region. Shown in FIG. 5 is an inner rectangle 22 of pixels 24 contiguous with the pixel of interest 14. It is important to note that according to the definition of a sparsely sampled local region as used herein, all of the pixels 24 contiguous with (i.e. immediately adjacent to) the pixel of interest 14 are included in the sparsely sampled local region. As a consequence of this requirement, the density of sampled pixels close to the pixel of interest is higher than for distances further away. This feature produces a higher degree of noise removal since the pixels closer to the pixel of interest are more likely to be part of the same local image structure.

Figure 6:
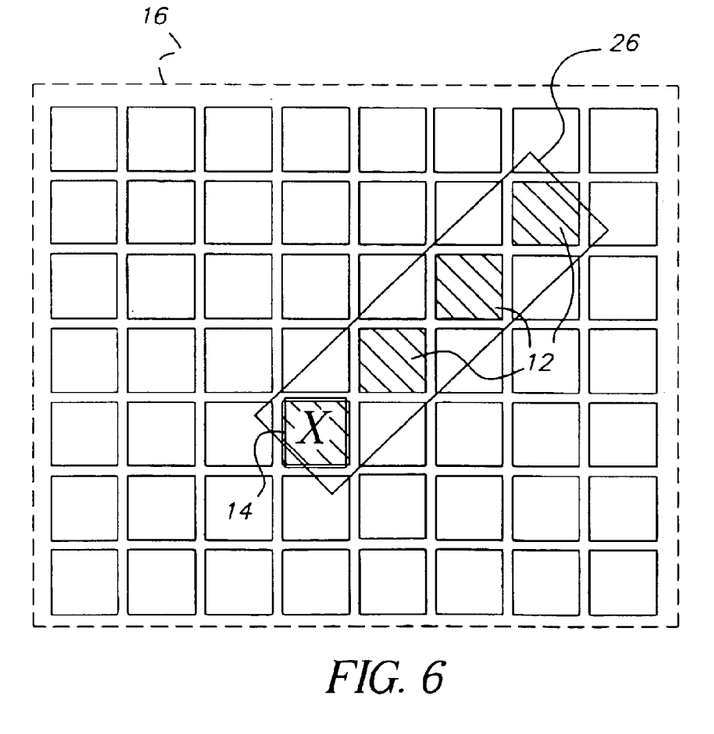
FIG. 6 shows a single radial sub-region used to construct a pixel sparsely sampled local region.

The term radially oriented pixel region is used herein to refer to a collection of pixels bounded by a rectangular region characterized by a width, length and orientation angle. The pixel of interest 14 is located at one end of the bounding rectangular region. FIG. 6 shows a single radially oriented pixel region 26 with a width of one pixel, a length of three pixels, and an orientation angle of 45 degrees with respect to the horizontal line passing through the pixel of interest. The shaded pixels 12 represent the pixels contained in the radially oriented pixel region 26 which includes the pixel of interest.

Figure 7:
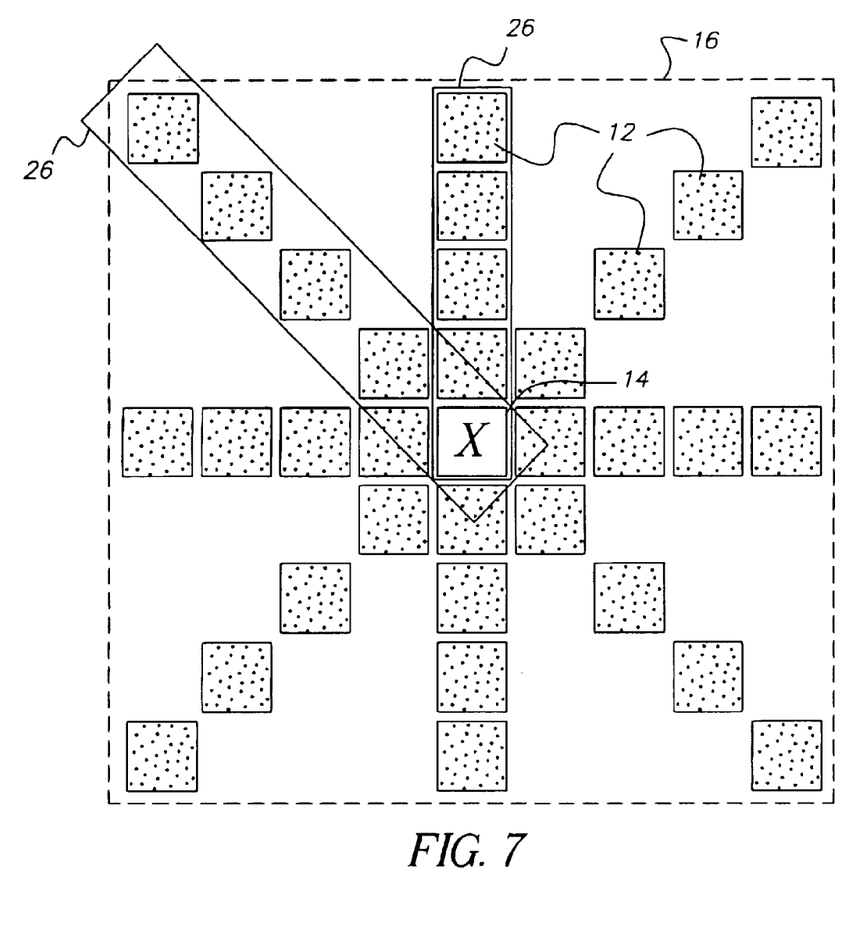
FIG. 7 shows an example of a 9 by 9 pixel sparsely sampled local region of pixels constructed from the union of multiple radial sub-regions.

According to one embodiment of the present invention, two or more radially oriented pixel regions 26 are combined in union to form a sparsely sampled local region of pixels. The union operation is used to include the pixels from more than one radially oriented pixel region, i.e. any pixel contained in any of the radially oriented pixel regions is contained in the sparsely sampled local region. FIG. 7 shows an example of the sparsely sampled local region 16 of the preferred embodiment of the present invention formed by the union of eight individual radially oriented pixel regions 26 of width one, length 5, with orientation angles 0, 45, 90, 135, 180, 225, 270, and 315 degrees. The union of the pixels contained in these eight radially oriented pixel regions forms one sparsely sampled local region 16. Thus, the example sparsely sampled local region is defined by the pixels in pixel regions radially oriented with respect to the pixel of interest 14.

Figure 8:
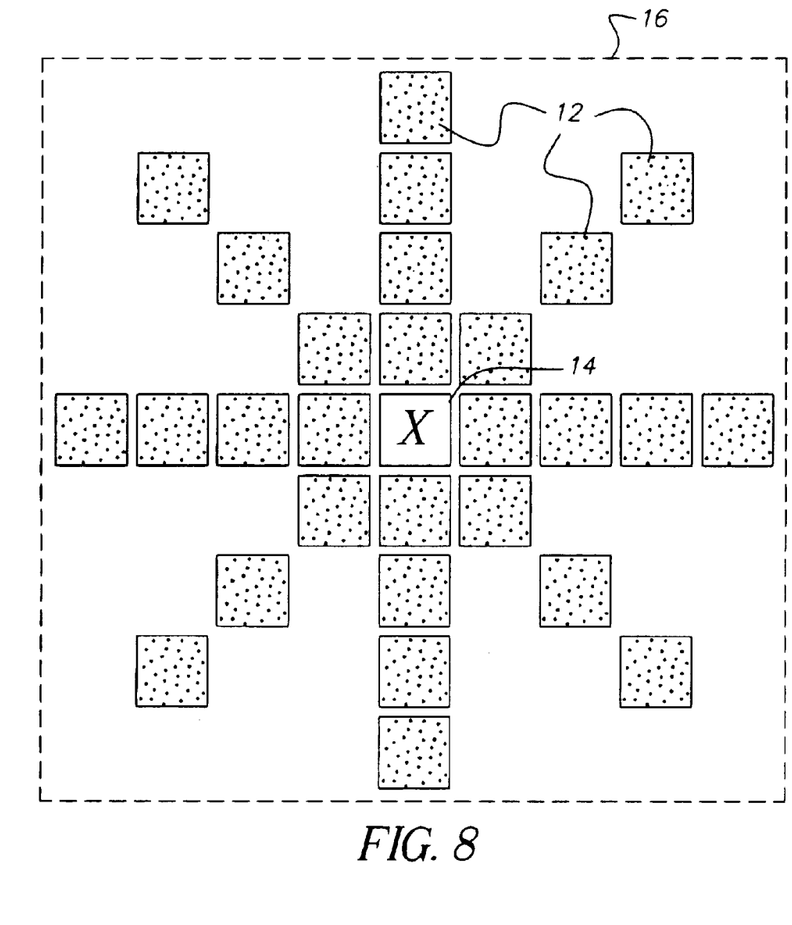
FIG. 8 shows an example of a sparsely sampled local region of pixels constructed from the union of different length multiple radial sub-regions.

FIG. 8 shows an alternative embodiment of the present invention. The sparsely sampled local region 16 is formed by eight individual radially oriented pixel regions of width one. A length of 5 is used for the radially oriented pixel regions with orientation angles 0, 90, 180, and 270 degrees. A length of 4 is used for the radially oriented pixel regions with orientation angles 45, 135, 225, and 315 degrees. This collection of radially oriented pixel regions forms a single sparsely sampled local region that is nearly circularly symmetric.

Figure 9:
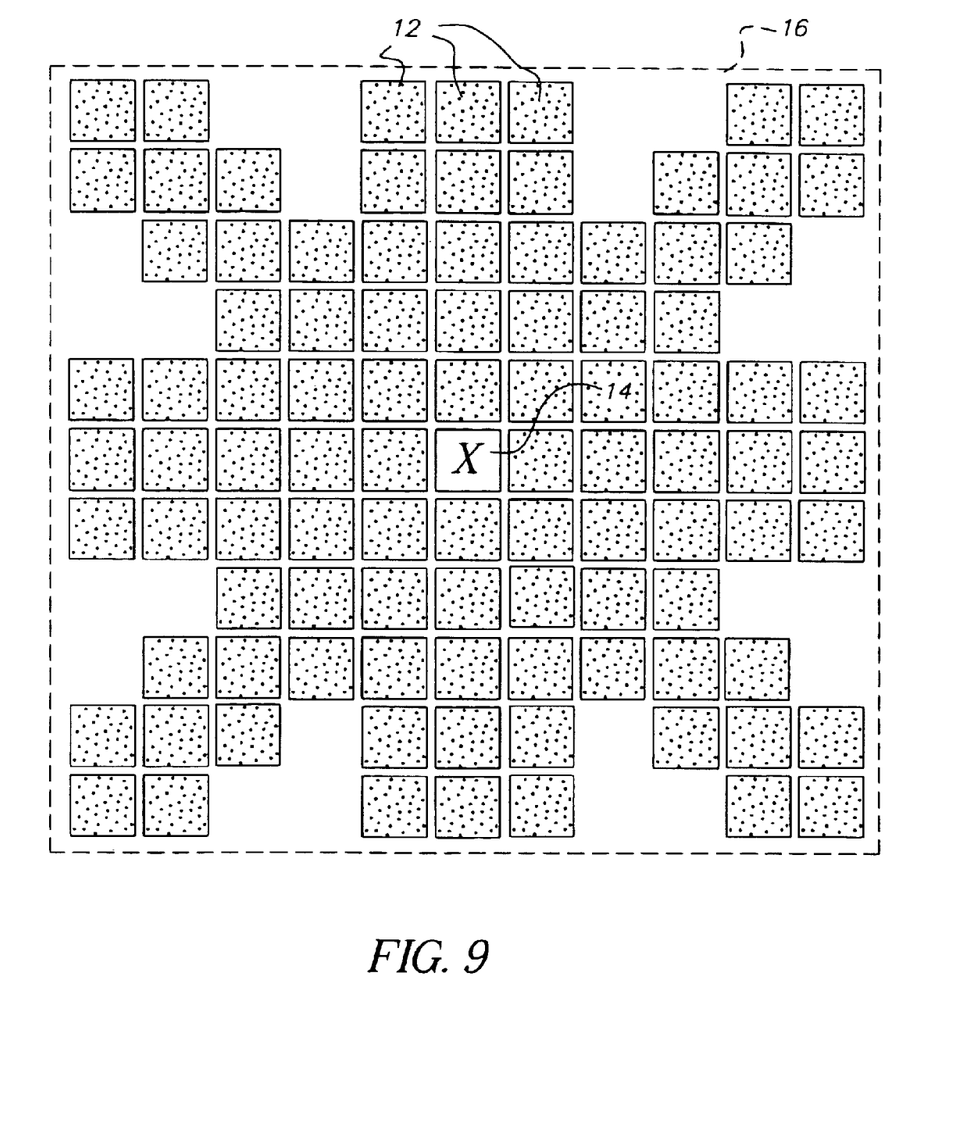
FIG. 9 shows an example of a sparsely sampled local region of pixels constructed from the union of different width multiple radial sub-regions.

The widths of the individual radially oriented pixel regions do not have to be the same. FIG. 9 shows the sparsely sampled local region 16 formed by eight individual radially oriented pixel regions of length six. A width of 3 is used for the radially oriented pixel regions with orientation angles 0, 90, 180, and 270 degrees. A width of 2 is used for the radially oriented pixel regions with orientation angles 45, 135, 225, and 315 degrees.

Figure 10:
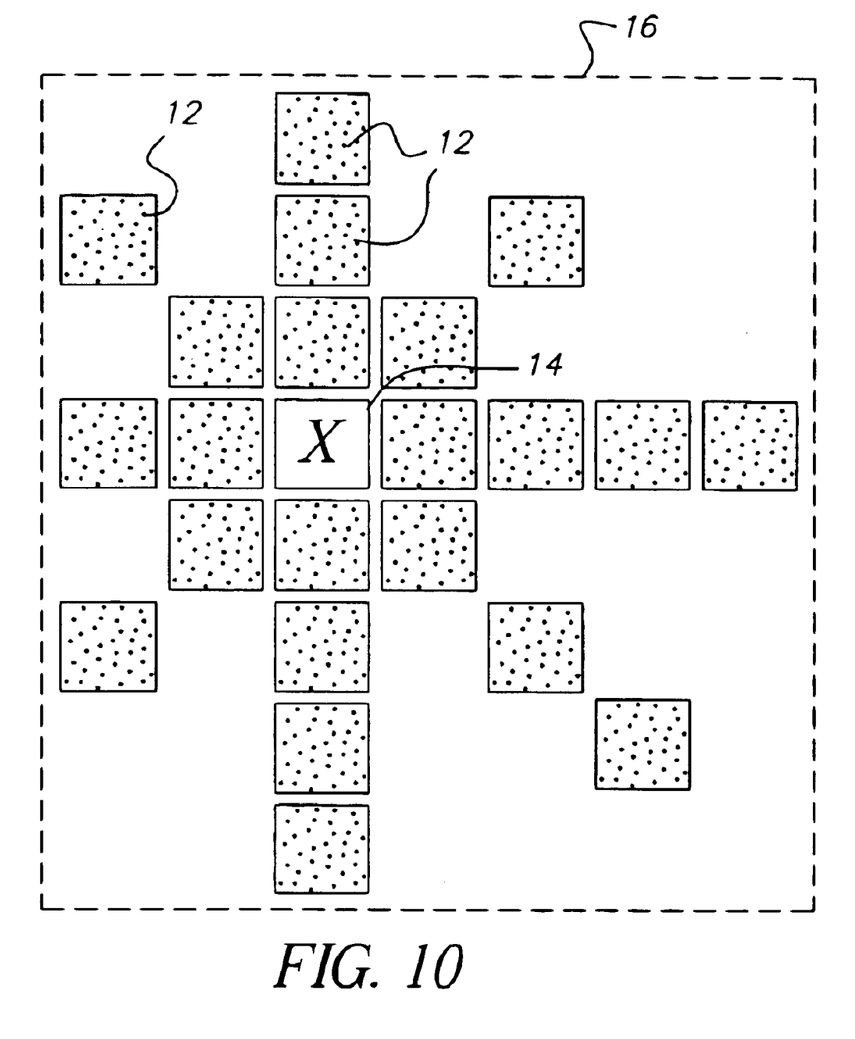
FIG. 10 shows an example of an asymmetrically shaped sparsely sampled local region of pixels constructed from the union of different length multiple radial sub-regions.

The lengths of the individual radially oriented pixel regions do not have to be symmetric with respect to the pixel of interest. FIG. 10 shows the sparsely sampled local region formed by eight individual radially oriented pixel regions of width one. Lengths of 5, 3, 4, 3, 3, 3, and 5, are used for the radially oriented pixel regions with orientation angles 0, 45, 90, 135, 180, 225, 270, and 315 degrees respectively.

Figure 11:
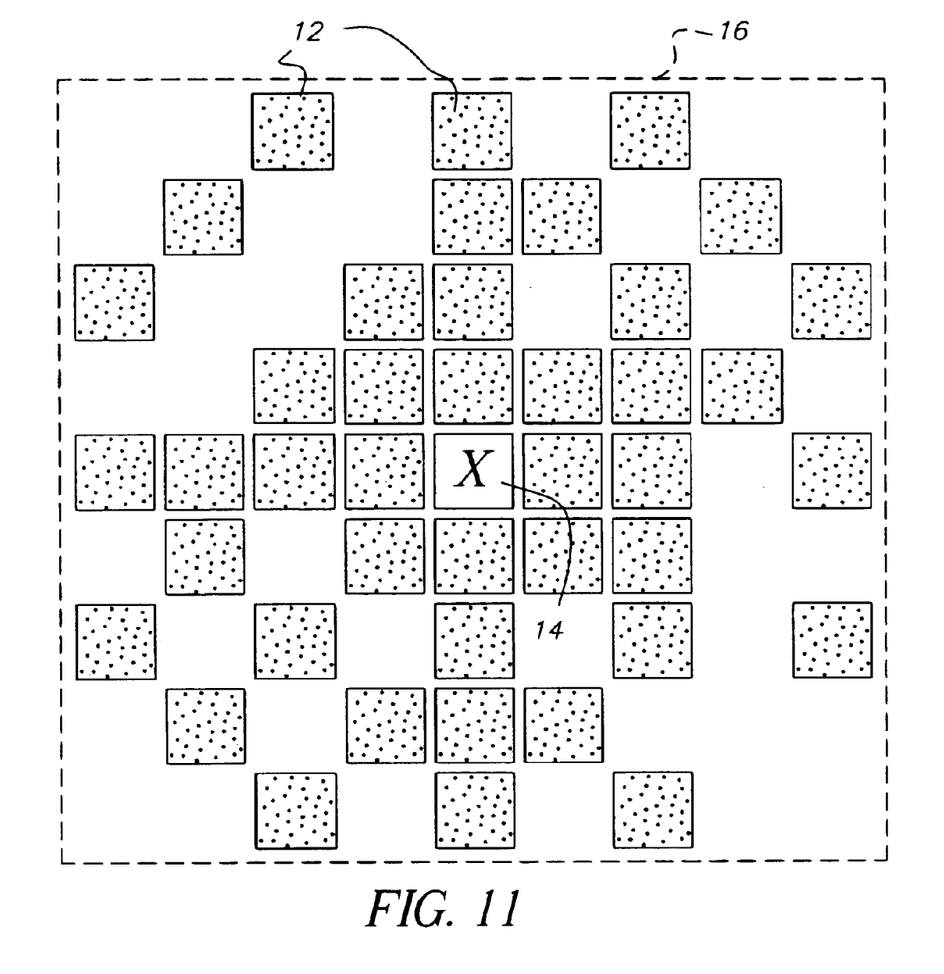
FIG. 11 shows an example of an asymmetrically shaped sparsely sampled local region of pixels with more densely sampled pixels near the pixel of interest containing detached pixels.

The geometry of pixels for sparsely sampled local region does not have to fit a prescribed regular pattern. FIG. 11 shows a sparsely sampled local region employing non-uniform and asymmetric sampling. The set of sampled pixels contained within this sparsely sampled local region are not all contiguous. That is, some of the sampled pixels are disconnected from others. This pattern of sparsely sampled pixels was not generated using any of the techniques discussed above, rather is was generated by hand to form a somewhat random pattern of pixels that meet the requirements of a sparsely sampled array as defined above.

The invention has been described in detail with particular reference to certain preferred embodiments thereof, but it will be understood that variations and modifications can be effected within the spirit and scope of the invention.

PARTS LIST

- 10 digital image source
- 12 pixels
- 14 pixel of interest
- 16 sparsely sampled local region
- 18 excluded pixel locations
- 20 digital image processor
- 22 inner rectangle
- 24 pixels contiguous to the pixel of interest
- 26 radially oriented pixel region
- 30 computer memory
- 40 digital image display
- 50 pixel of interest selector
- 60 noise reduction calculator
- 70 pixel replacer
- 80 next pixel selector
- 90 statistics accumulator
- 100 noise cleaned pixel calculator

What is claimed is:

1. A method of processing a digital image channel to remove noise, comprising the steps of:

a) identifying a pixel of interest;

b) calculating a noise reduced pixel value from a single weighted average of the pixels in a single sparsely sampled local region including the pixel of interest and all pixels that are immediately adjacent to the pixel of interest, the sparsely sampled local region comprising at least first and second pixel regions that are radially oriented with respect to the pixel of interest, wherein at least one of said at least first and second radially oriented pixel regions has both a width and a length of pixels that is different from the length and width of the other of said at least first and second radially oriented pixel regions and wherein all the pixels in said sparsely sampled region are contiguous, and having a denser sampling nearer the pixel of interest, by i) calculating the absolute differences between the values of the sparsely sampled pixels and the pixel of interest;

ii) comparing the absolute differences with a predetermined threshold value to generate a weighting factor for each of the sparsely sampled pixels;

iii) calculating the noise reduced pixel value as the weighted average value of the sparsely sampled pixels;

c) replacing the original value of the pixel of interest with the noise reduced pixel value;

d) repeating steps (a) through (c) for other pixels in the digital image channel.

2. The processing method claimed in claim 1, wherein the weighting factor is zero or one.

3. The processing method claimed in claim 2, wherein the predetermined threshold is twice the standard deviation of an expected noise source.

4. The processing method claimed in claim 1, wherein the radially oriented pixel regions define horizontal, vertical, and diagonal lines of pixels.

* * * * *